Figure 1:
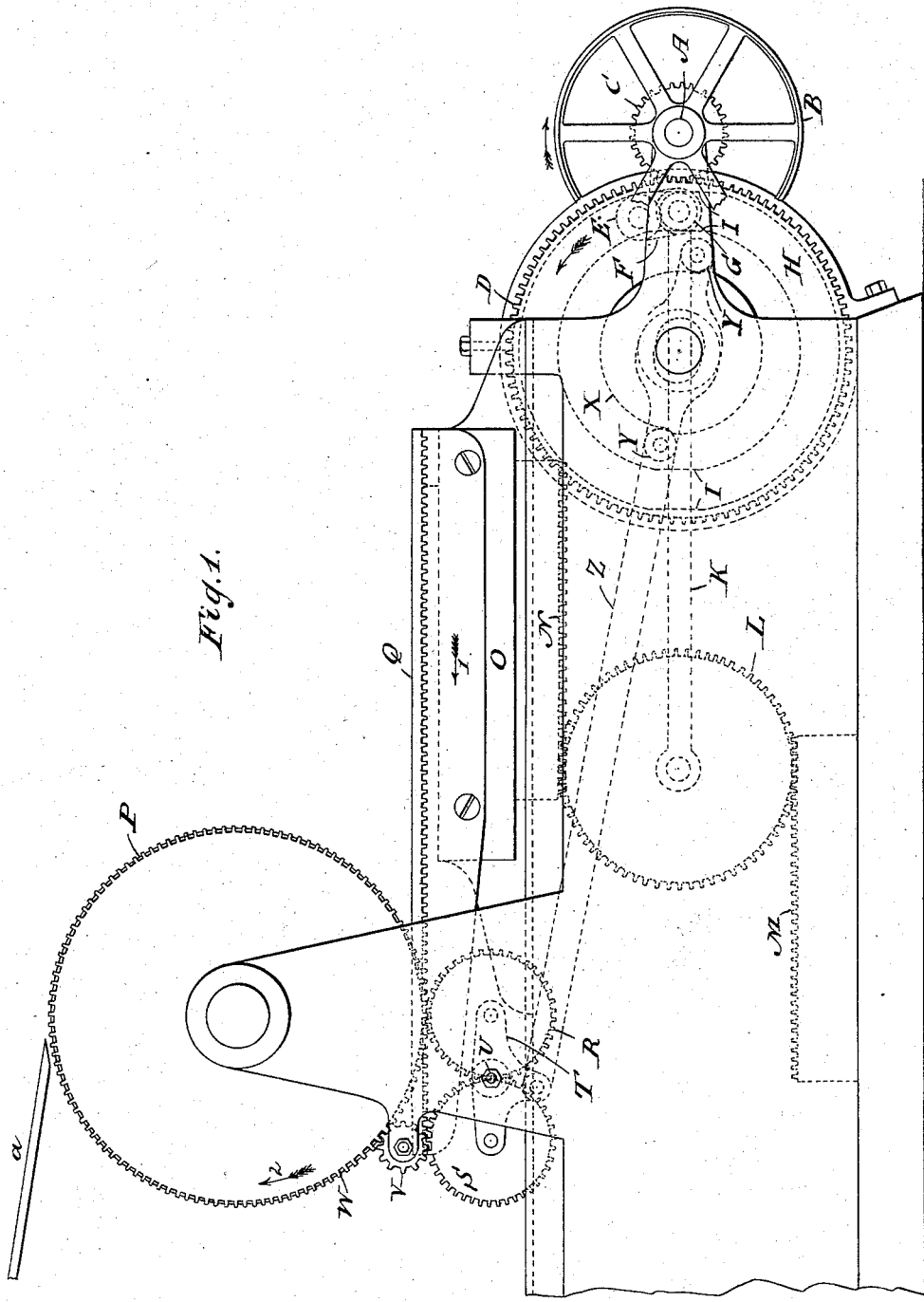

(No Model.)  2 Sheets—Sheet 1.
G. P. FENNER.
CYLINDER PRINTING MACHINE.

No. 407,652. Patented July 23, 1889.

Witnesses:
Edward Wolff
William Miller

Inventor:
George P. Fenner.
By Van Santvoord & Hauff
Attorneys.

(No Model.) 2 Sheets—Sheet 2.
G. P. FENNER.
CYLINDER PRINTING MACHINE.
No. 407,652. Patented July 23, 1889.
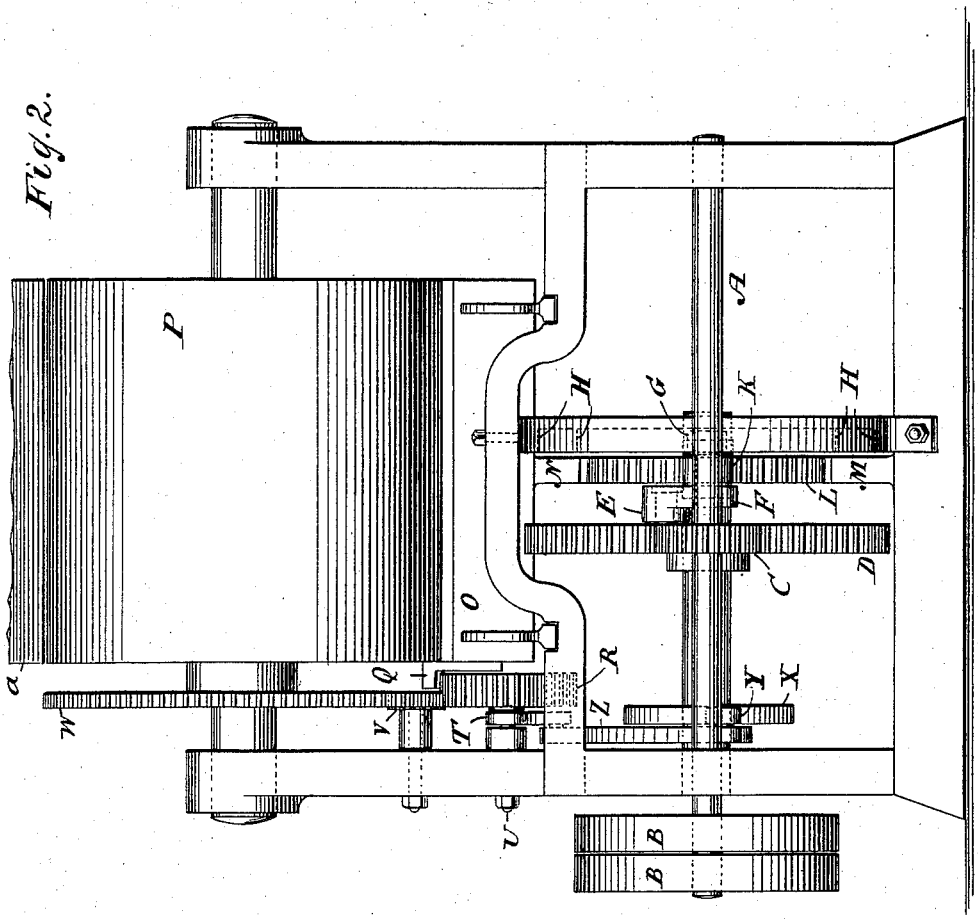
Witnesses:
Edward Wolff.
William Miller
Inventor:
George P. Fenner.
By Van Santvoord & Hauff
Attorneys.

ns mounted i# UNITED STATES PATENT OFFICE.

GEORGE P. FENNER, OF NEW LONDON, CONNECTICUT.

CYLINDER PRINTING-MACHINE.

SPECIFICATION forming part of Letters Patent No. 407,652, dated July 23, 1889.

Application filed September 27, 1888. Serial No. 286,505. (No model.)

*To all whom it may concern:*

Be it known that I, GEORGE P. FENNER, a citizen of the United States, residing at New London, in the county of New London and State of Connecticut, have invented new and useful Improvements in Cylinder Printing-Machines, of which the following is a specification.

This invention relates to an improvement in printing-presses, as set forth in the following specification and claims, and illustrated in the accompanying drawings, in which—

Figure 1 is a side elevation of a printing-press, parts being broken away. Fig. 2 is a front elevation of said printing-press.

Similar letters indicate corresponding parts.

In the drawings, the letter A indicates a driving-shaft having pulleys B B—one fast, the other loose—so that the driving-shaft can be actuated or allowed to come to rest in the usual way. A gear-wheel C communicates motion from the driving-shaft to the gear-wheel D. A crank or crank-pin E is rotated by the gear D. To the crank E is connected a link F, having a pin or stud G, engaging a cam H, fixed to the apparatus. The cam H has portions I I, Fig. 1, which are formed as arcs of circles the radii of which are equal to the distance from the point of oscillation of the link K, on the gear-wheel L, to the edges of the portions I I. The crank E, continuously rotating, carries the stud G about in the way of the cam H, and as said stud G arrives at the end of a stroke it passes along the cam portions I and does not begin its return-stroke until it has passed such portion I. The stud G connects by a link K with the gear-wheel L, and said stud and link cause said wheel L to move back and forth along the rack M, so that said wheel L, through the rack N, reciprocates the type-bed O. As the type-bed arrives at the end of a stroke, the stud G enters a portion I of the cam H, and the return-stroke of the bed O does not commence until said stud G has passed said cam portion I. The type-bed is thus allowed to remain temporarily at rest at the end of each stroke prior to beginning a return-stroke.

P is the impression-cylinder. The type-bed O has a rack Q. When the parts are in the position shown in Fig. 1, with the type-bed about to move in the direction of arrow 1, the cam X, by means of a link Z, is shifting the gears R S, so as to throw the gear R into gear with the rack Q and gear W, and to throw the gear S out of gear with the rack Q and gear V. The gear-wheels R S engage one another, and are mounted in a frame T, adapted to oscillate about the pivot U. The frame T has a link Z, the lugs or rollers Y of which engage a cam X on the shaft of the gear D.

The operation of the device is as follows: The parts being in the position shown in Fig. 1, a sheet fed off the feed-board a is about to be carried between the impression-cylinder P and the type-bed O. The rack Q being in gear with the wheel R and out of gear with the wheel S, the motion of the rack Q in the direction of arrow 1 will rotate the gear R, so as to rotate the gear W and cylinder P in the direction of arrow 2. During this action of the gear R, the gears S V rotate idly, and said gears are not in gear with one another. When the type-bed O has arrived at the end of its stroke and remains for a moment at rest, the cam X shifts or oscillates the frame T, so as to move the wheel R out of gear with the rack Q and gear W and to move the wheel S into gear with the rack Q and gear V. The rack Q and the type-bed O, now making their return-stroke in the direction opposed to arrow 1, the rack Q will rotate the wheels S V W, so that the impression-cylinder P again moves in the direction of arrow 2. It will thus be noticed that the cylinder P is made to rotate in the same direction at each reciprocation of the type-bed O. The cylinder P receiving its motion from the type-bed O, the cylinder P will remain for a moment at rest as the bed O remains for a moment at rest at the end of each stroke of the bed. Time is thus given for properly feeding a sheet off the board a, and jarring of the mechanism, which might occur by a sudden change of motion, is avoided. The type-bed O and cylinder P remain continually geared together either by the gear R engaging the rack Q and gear W, or by the gear S engaging the rack Q and gear V. The construction of the press is thus simplified, as no mechanism is required for throwing the impression-cylinder at times into gear with the type-bed and for holding the cylinder at other times out of gear with the bed. The gear V, as seen in Fig. 1, remains constantly in gear with the gear W, and the gears R S, as is seen in Fig. 2, are so wide that they mesh into both the rack Q and into the gear W or V, as the case may be.

What I claim as new, and desire to secure by Letters Patent, is—

1. The combination, with a reciprocating type-bed and an impression-cylinder, of an actuating crank or wheel E, link K, gears L M, connecting the crank or wheel and type-bed, and a guide-cam H, guiding said link and constructed to allow the type-bed to remain temporarily at rest at the end of each reciprocation, substantially as described.

2. The combination, with a reciprocating type-bed and an impression-cylinder, of shifting-gears R S, for conveying motion between the cylinder and type-bed, and a cam for shifting said gears, substantially as described.

3. The combination, with an impression-cylinder and a reciprocating type-bed, of a mechanism for reciprocating said bed, said mechanism consisting of a crank or crank-pin E, a link F, and a stationary cam H, engaged by said link, substantially as described.

In testimony whereof I have hereunto set my hand and seal in the presence of two subscribing witnesses.

GEORGE P. FENNER. [L. S.]

Witnesses:
HIRAM W. HUBBARD,
GEORGE COLFAX.